July 16, 1963

J. H. WRIGHT, JR 3,097,584

RAPID PROCESSING APPARATUS

Filed May 4, 1960

INVENTOR.
JOSEPH H. WRIGHT, Jr.

BY
Lane, Dalsimer and Kane

ATTORNEYS

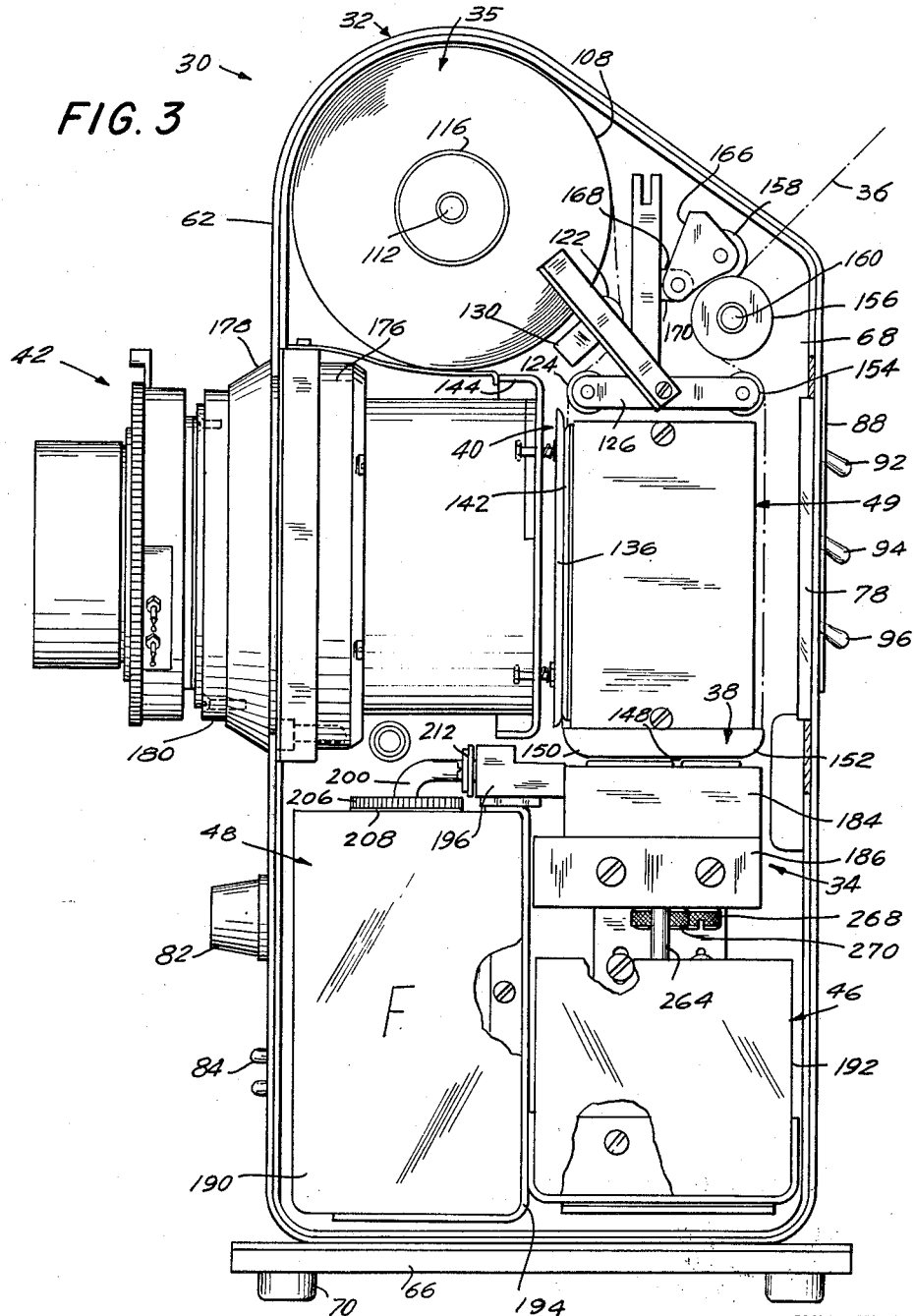

July 16, 1963  J. H. WRIGHT, JR  3,097,584
RAPID PROCESSING APPARATUS
Filed May 4, 1960  9 Sheets-Sheet 3

INVENTOR.
JOSEPH H. WRIGHT, Jr.
BY
Kane, Dalsimer and Kane
ATTORNEYS

July 16, 1963  J. H. WRIGHT, JR  3,097,584
RAPID PROCESSING APPARATUS
Filed May 4, 1960  9 Sheets-Sheet 4

INVENTOR.
JOSEPH H. WRIGHT, Jr.
BY
Kane, Dalsimer and Kane
ATTORNEYS

July 16, 1963

J. H. WRIGHT, JR 3,097,584

RAPID PROCESSING APPARATUS

Filed May 4, 1960

INVENTOR.
JOSEPH H. WRIGHT, JR.
BY
Kane, Dalsimer and Kane

ATTORNEYS

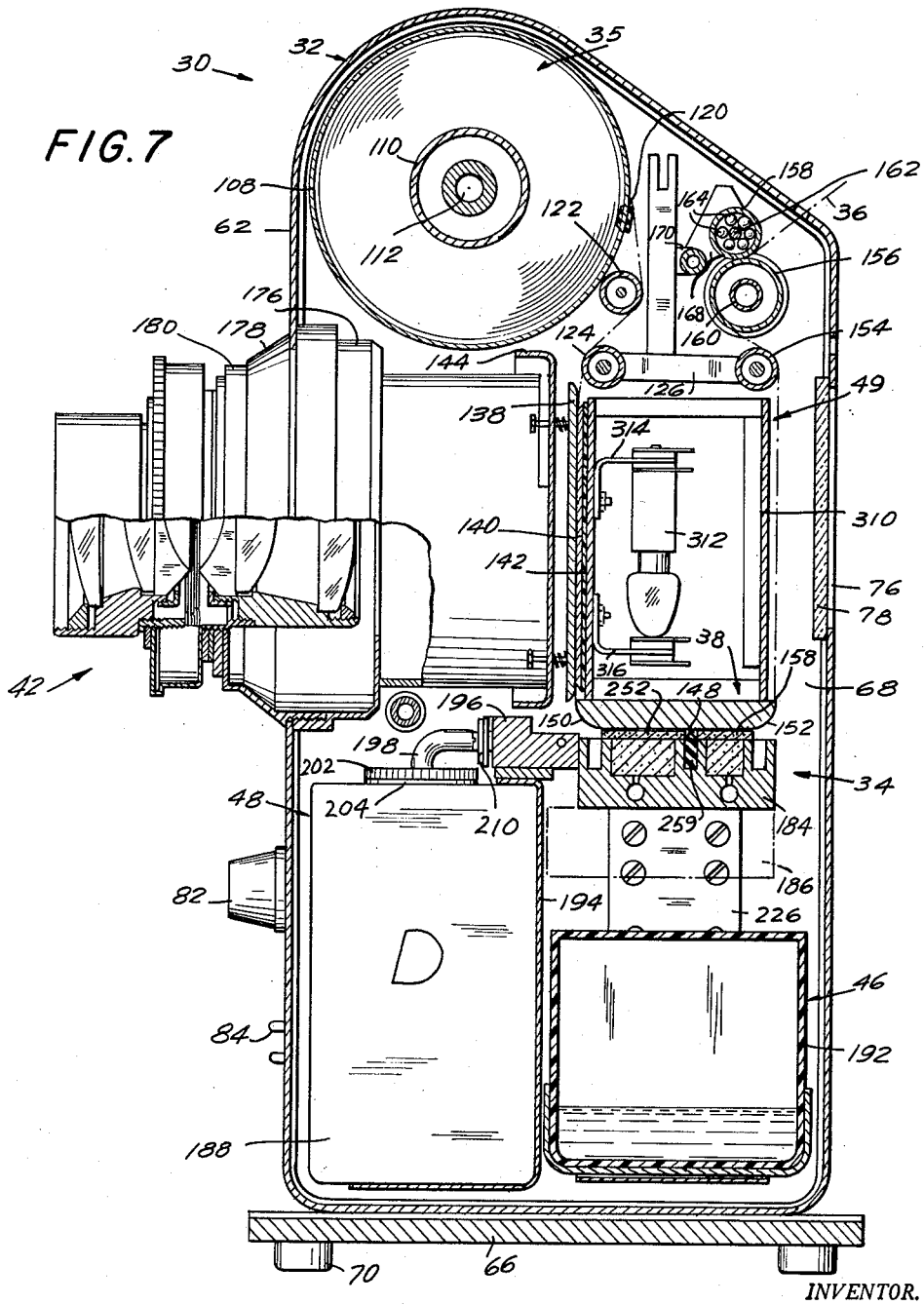

July 16, 1963 J. H. WRIGHT, JR 3,097,584
RAPID PROCESSING APPARATUS
Filed May 4, 1960 9 Sheets-Sheet 7
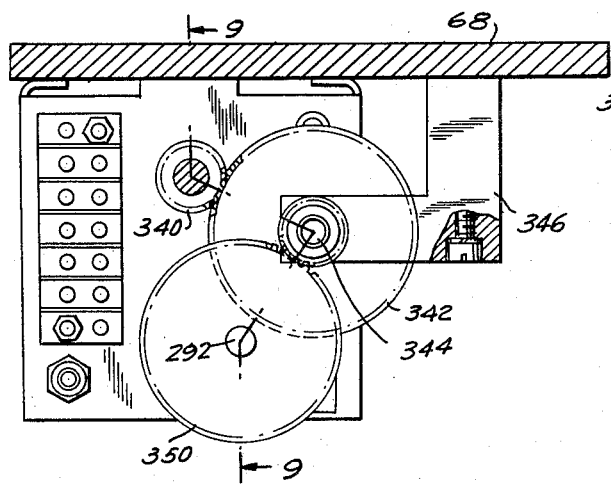
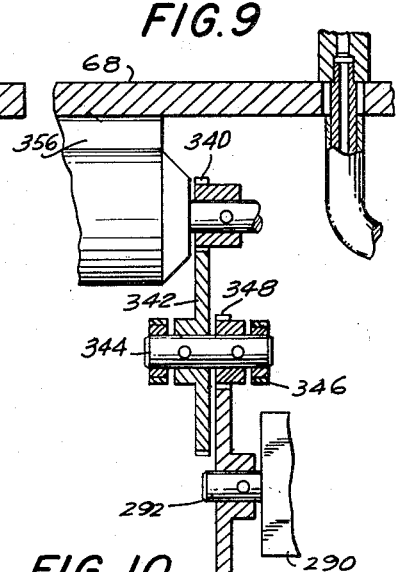
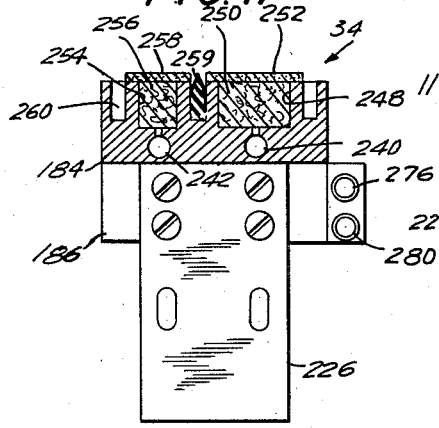
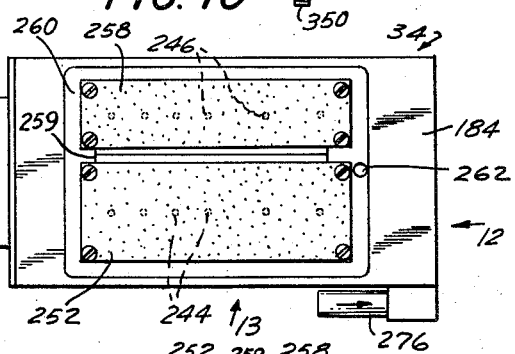
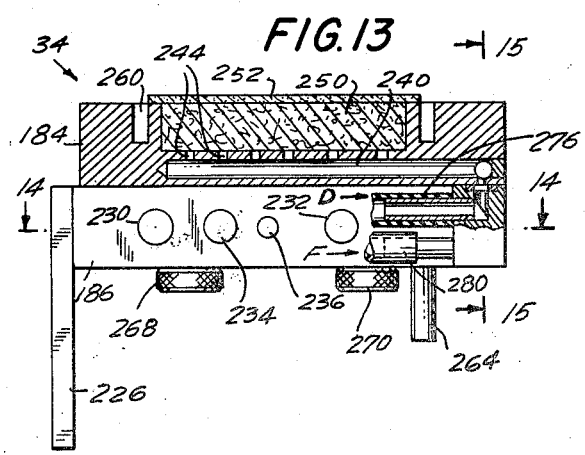
INVENTOR.
JOSEPH H. WRIGHT, Jr.
BY Kane, Dalsimer and Kane
ATTORNEYS July 16, 1963  J. H. WRIGHT, JR  3,097,584
RAPID PROCESSING APPARATUS
Filed May 4, 1960  9 Sheets-Sheet 8
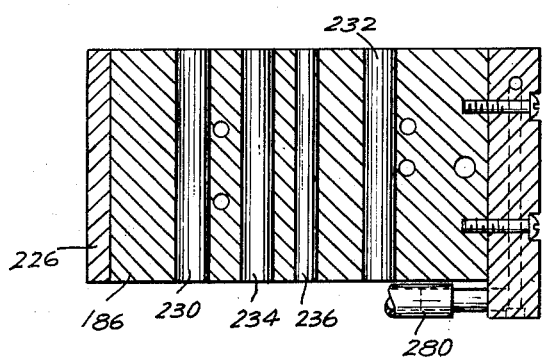
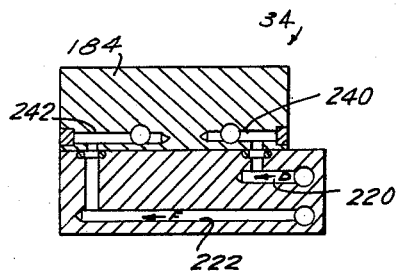
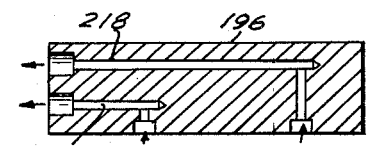
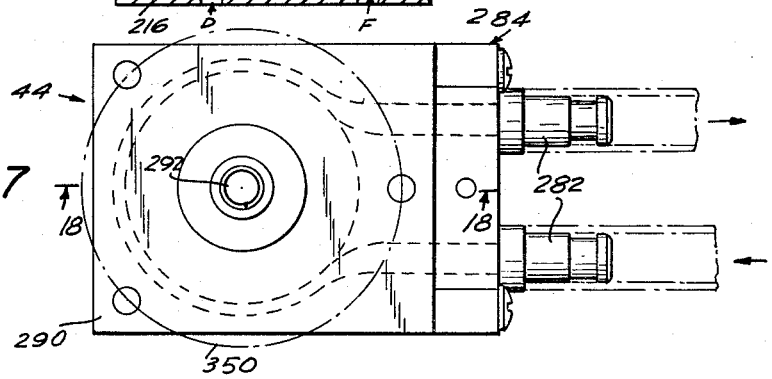
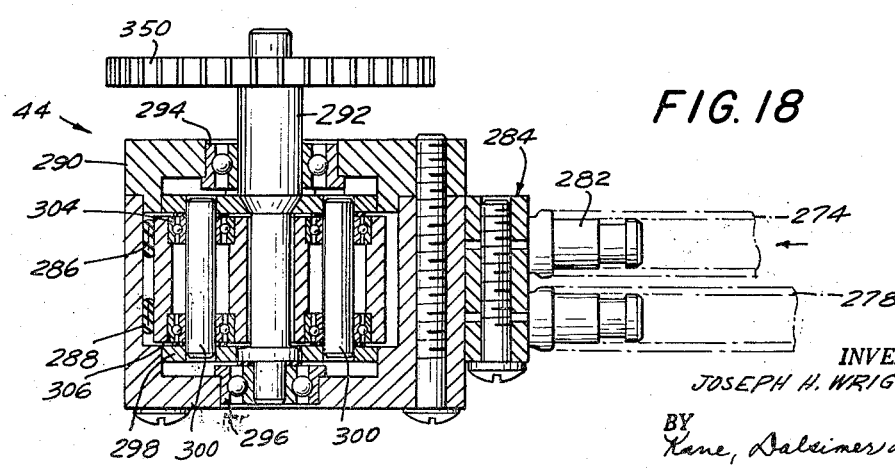
INVENTOR.
JOSEPH H. WRIGHT, Jr.
BY
Kane, Dalsimer and Kane
ATTORNEYS July 16, 1963  J. H. WRIGHT, JR  3,097,584
RAPID PROCESSING APPARATUS
Filed May 4, 1960  9 Sheets-Sheet 9

INVENTOR.
JOSEPH H. WRIGHT, Jr.
BY
Kane, Dalsimer and Kane

ATTORNEYS

United States Patent Office 3,097,584
Patented July 16, 1963

3,097,584
RAPID PROCESSING APPARATUS
Joseph H. Wright, Jr., Port Jefferson, N.Y., assignor to Photomechanisms, Inc., Huntington Station, N.Y.
Filed May 4, 1960, Ser. No. 26,807
15 Claims. (Cl. 95—12)

The present invention relates to film processing, and more particularly to an improved apparatus for rapidly processing recorded information on film in an efficient manner.

An object of the present invention is to provide a self-contained unit which fills the need for a device to record transient or fixed graphic data, information or object while, at the same time, present the record within a relatively short period of time in observable form for many later uses.

Another object is to provide an entirely self-contained unit capable of recording on film an event, scene or document, one which can rapidly process the recorded information, as well as render this recorded information for immediate viewing without undue delay.

Still another object is to provide the above self-contained unit which is extremely simple to load, operate and maintain, and which provides for quality processing without the use of vacuum pumps, valves or small orifices or any components requiring frequent servicing.

A further object is to provide a processor assembly for such apparatus having porous applicators capable of supplying processing solutions over predetermined sectors and areas of film by employing surface tension effects which form a stable meniscal boundary incident to the utilization of a controlled rate of flow of solution so that meniscus formation is not destroyed.

A still further object is to incorporate in the above apparatus a pumping means for supplying a limited flow of solution to the porous blocks such that the meniscal boundaries are maintained whether or not the film is moving; and when the latter is the case, the pumping means is also placed in an inoperative position such that the meniscus is maintained without spilling; and the spent solutions are adapted to be drained by gravity, thereby requiring no vacuum line, nozzle or the like.

An important object is to provide a processing assembly for the above apparatus having a porous processor block capable of producing a meniscus formation such that the meniscal boundary is not destroyed by low rate of flow of solutions; instead, excess runs off in a controlled manner down exterior faces of the porous block and is caught in a channel manifolded and drained to a waste tank, the block being provided with proper internal manifolding and means to permit uniform and non-pulsing flow htrough a porous applicator shoe to the exposed film.

Another important object is to provide separate processing solution applicators and thermostatically controlled heating means in a processing assembly for such apparatus wherein the solution application may be quickly removed for cleaning when required without disturbing plumbing or wiring connections, and at the same time being completely immersed in hot water or solvent chemicals for purposes of completing a cleaning operation.

A further important object is to provide such apparatus with viewing means located and operable immediately beyond the processing assembly, as well as with means capable of drying the film in a relatively short period of time, and, under most circumstances, before it emerges from the apparatus housing.

An additional object is to provide an improved film processing apparatus employing a stationary film support during the film processing cycle, thereby minimizing volume requirements for the processing equipment and, consequently, lighter weight and simpler equipment, while permitting multi-station processing with minimum equipment size, and/or substantially longer application shoes which, in turn, permit higher film processing rates.

A further additional object is to provide a relatively simple and reliable camera processor of minimum size and weight which functions to provide minimum time lag between exposure and delivery of a frame for viewing.

Other objects and advantages will become apparent from the following detailed description which is to be taken in connection with the accompanying drawings in which:

FIG. 3 is a side elevational view of the apparatus with one of the covers of the housing removed for the purposes of showing the components contained in the housing;

FIG. 7 is a sectional view of the apparatus taken along the line 7—7 of FIG. 6 with the camera optical system partially broken away and removed;

FIG. 8 is a partial sectional view taken along the line 8—8 of FIG. 4 and illustrating the gear train of the pump drive;

FIG. 9 is a cross-sectional view taken along the line 9—9 of FIG. 8;

FIG. 10 is a top plan view of the processor assembly of the film processing apparatus of the present invention;

FIG. 11 is an end view partially in section of this processor assembly;

FIG. 12 is similarly an end view of this assembly with certain parts broken away and removed;

FIG. 13 is a front view of the assembly with certain parts broken away and removed and others partially sectioned;

FIG. 14 is a sectional view of the processor assembly taken along the line 14—14 of FIG. 13;

FIG. 15 is a cross-sectional view taken along the line 15—15 of FIG. 13;

FIG. 16 is a sectional view taken along the line 16—16 of FIG. 6 illustrating the intake manifold for the processor blocks;

FIG. 17 is a top plan view of the relatively small positive displacement pump incorporated in the apparatus of the present invention;

FIG. 18 is a cross-sectional view taken along the line 18—18 of FIG. 17;

Figure 2:
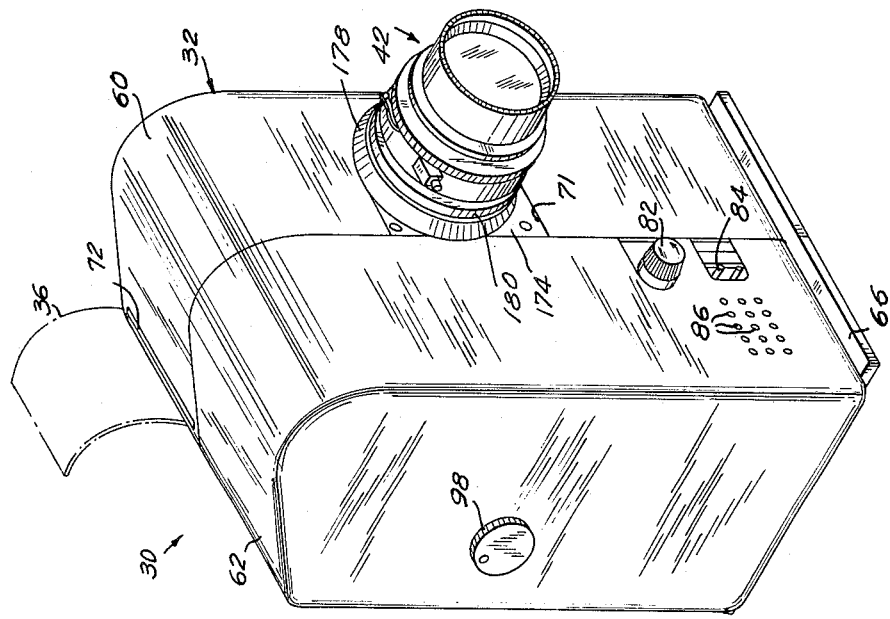
FIG. 2 is a front perspective view of this apparatus illustrating an optical system for exposing film to be ultimately processed.
Figure 1:
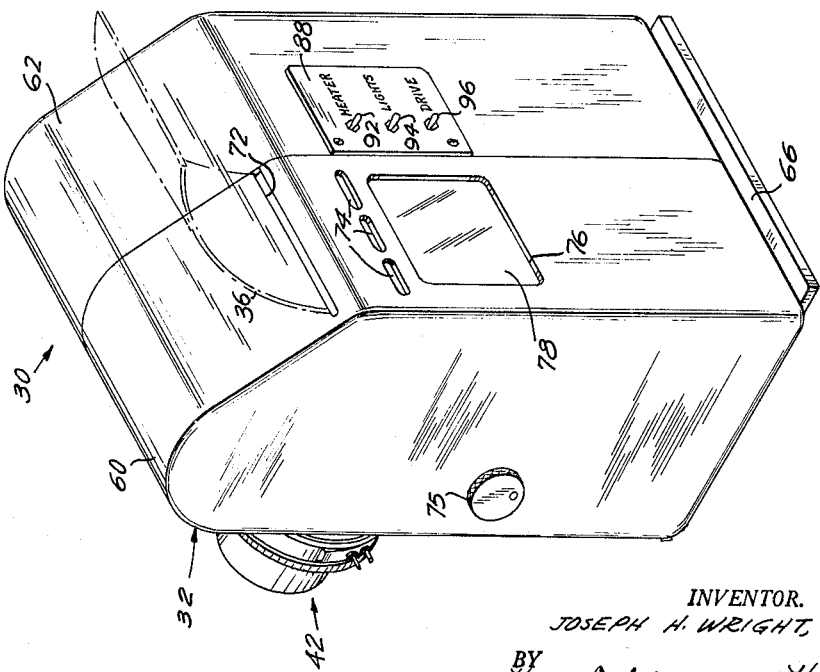
FIG. 1 is a perspective view of the rear of the film processing apparatus constructed in accordance with the present invention showing the film viewing aperture and switch plate assembly.
Figure 4:
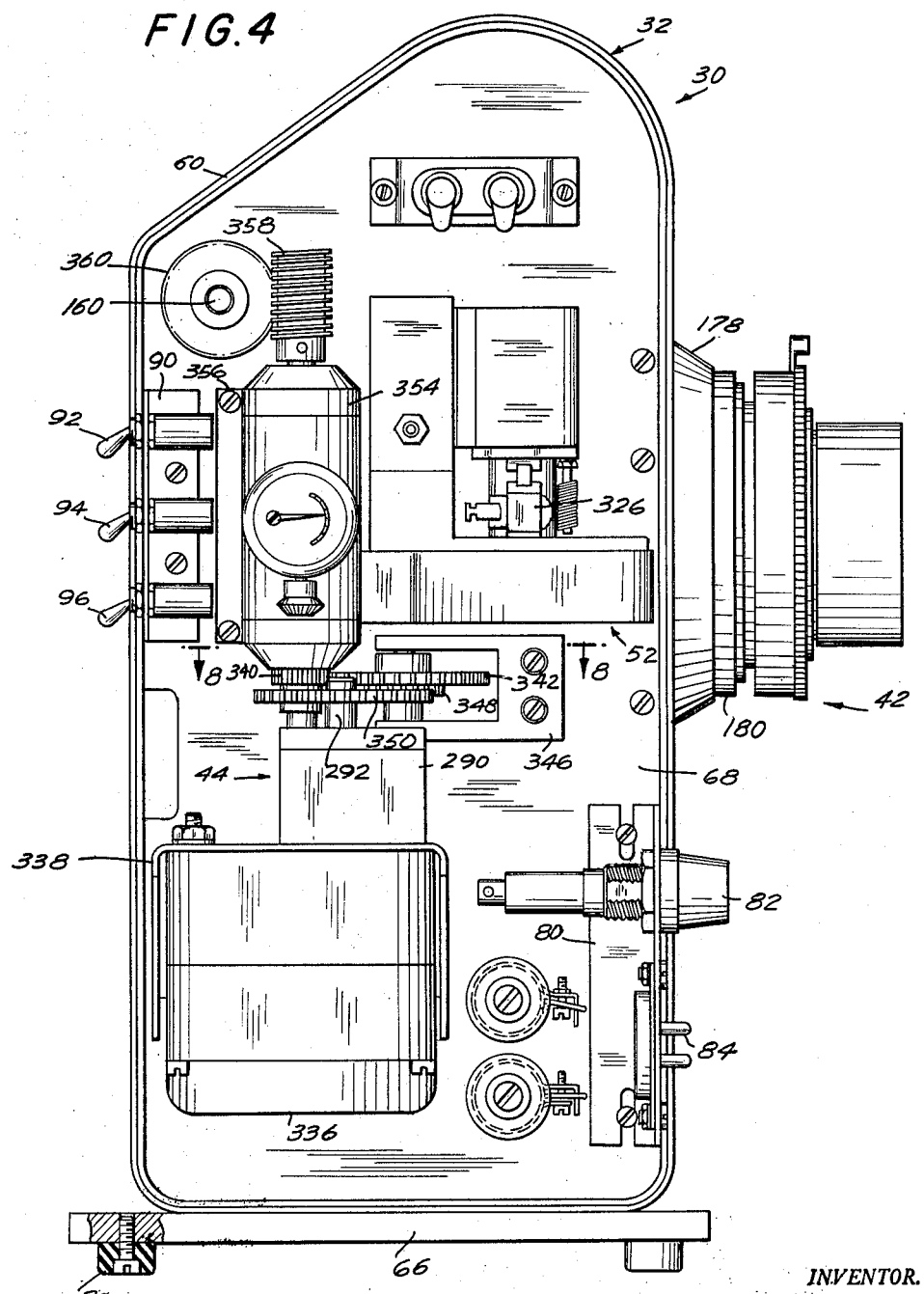
FIG. 4 is a similar side elevational view of the apparatus with the other housing cover removed.
Figure 5:
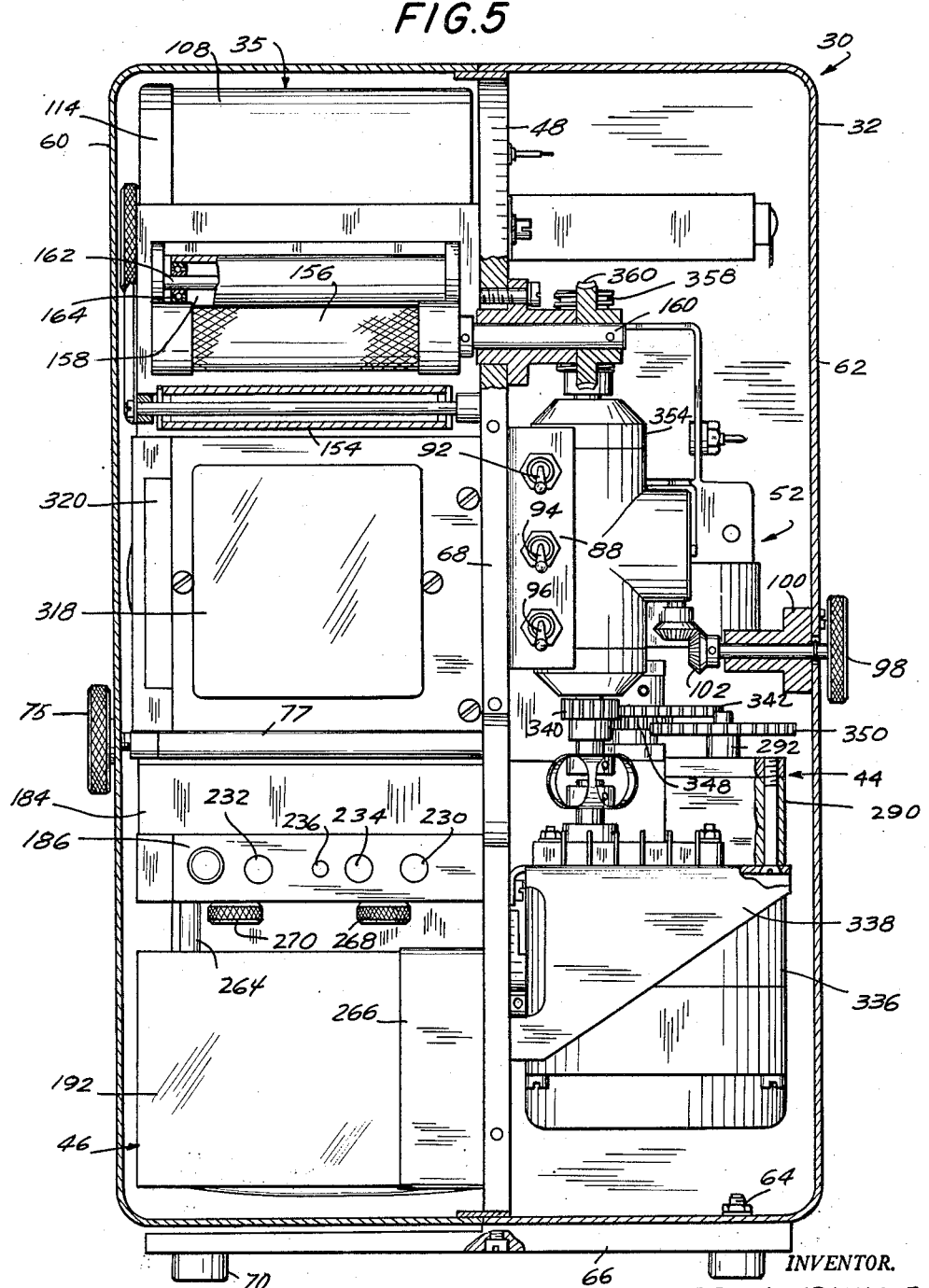
FIG. 5 is a rear elevational view of the apparatus with sectors of the housing removed and certain parts broken away, removed and sectioned.
Figure 6:
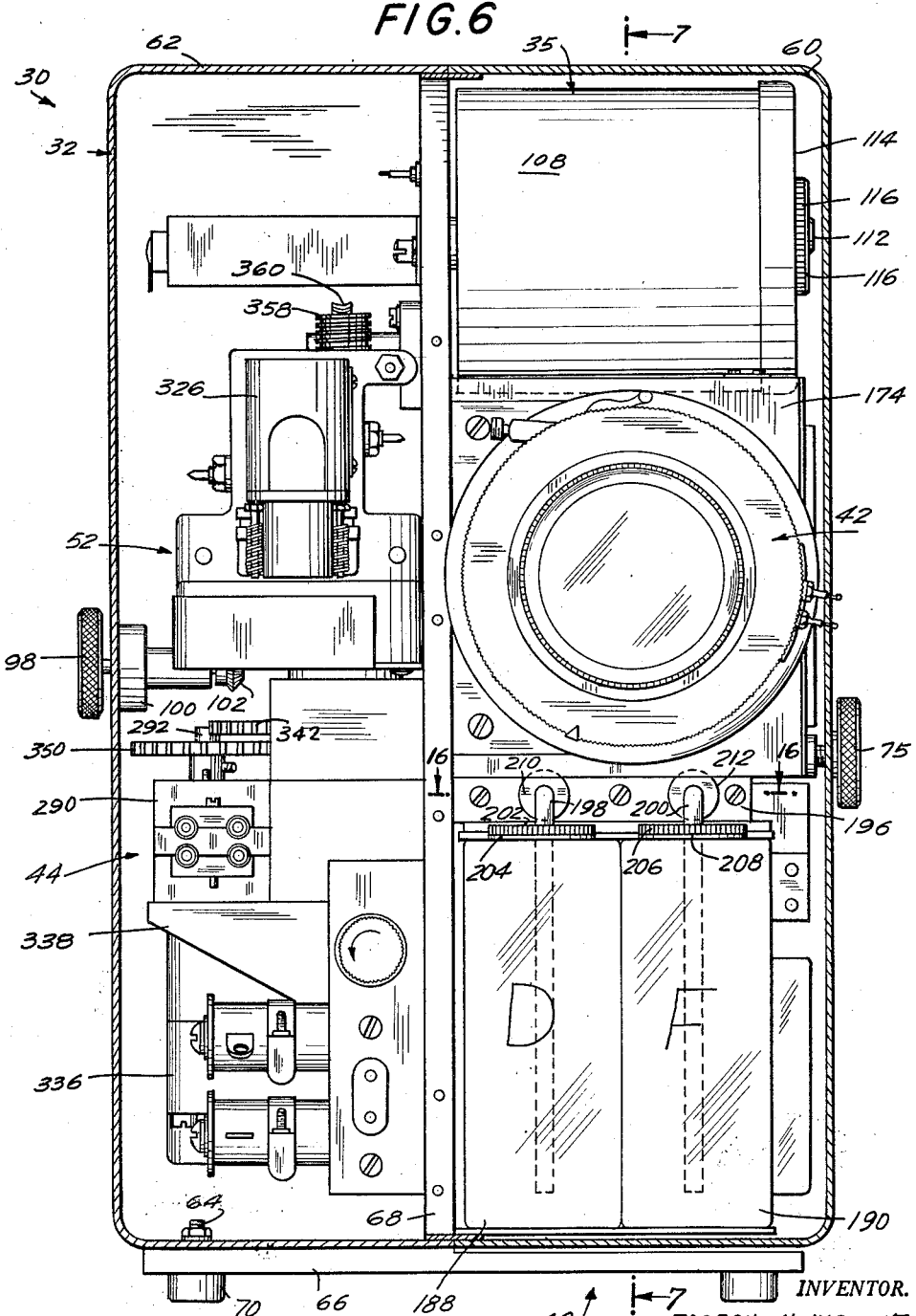
FIG. 6 is a front elevational view of the apparatus with portions of the housing broken away and removed.
Figure 19:
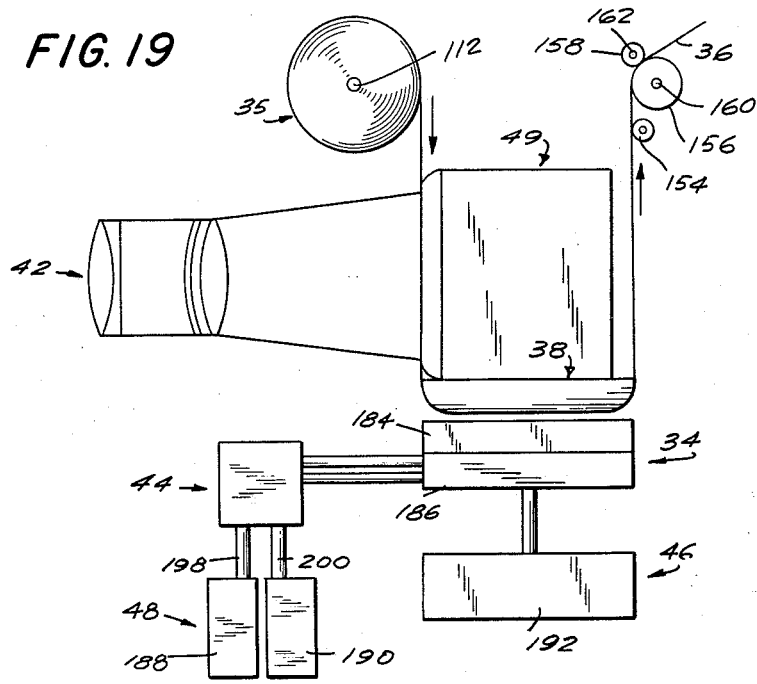
FIG. 19 is a schematic view of the components constituting the apparatus of the present invention.
Figure 20:
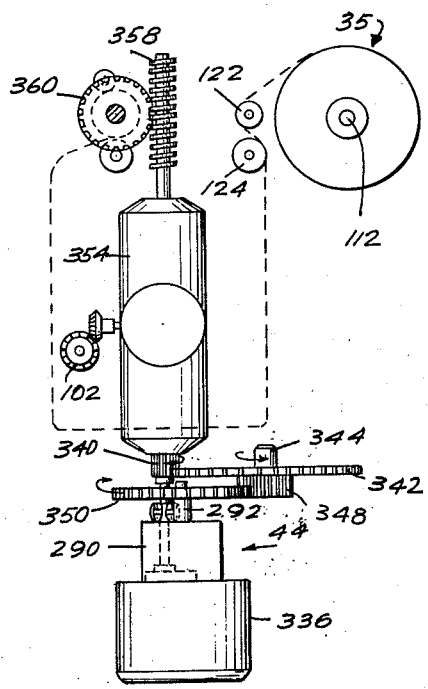
FIG. 20 is a schematic view of the drive system of the film processing apparatus.
Figure 21:
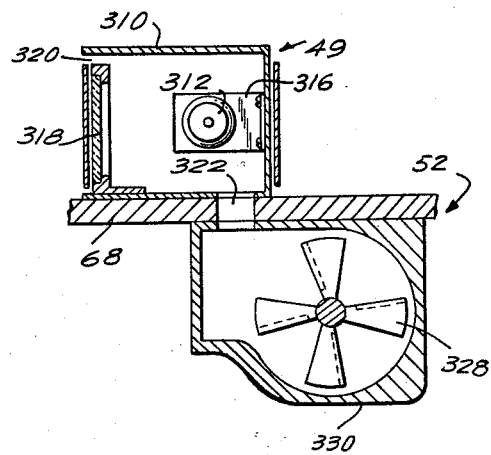
FIG. 21 is a schematic view with certain parts sectioned of the blower and lamp system.

Many prior arrangements have been devised for both continuous and step-wise rapid processing. Previously, and in particular with step-wise processors, the equipment involved has been bulky, complex, expensive and difficult to maintain. The invention described herein makes it possible to process film in any width with simple equipment either continuously or with adaptations in a step-wise fashion.

The fundamental principles utilized in this invention involve successive application of one or more liquids in close proximity space-wise.

In the form of the invention illustrated in the drawings, a 70 mm. camera-processor apparatus 30 having a housing 32 includes a processing assembly 34. This assembly 34 may have one or more porous shoes, to be described in detail shortly, maintained in close proximity to but not touching the emulsion of the 70 mm. film 36. The shoe is made of suitable material, inert to photographic chemicals, but through which liquids may be flowed by slight or moderate pressure difference between the inlet to the interior of the shoe and its exterior.

The processing liquid supplied to the interior of the shoe is forced by the pressure difference into the space between the exterior surface of the shoe and the emulsion surface of the film 36. The film 36 is moved continuously; and, since processing solutions are elevated in temperature prior to their application by means of heating means in the body of the shoe, the film is subjected to sudden dimensional changes and stresses at the area of solution application. Accordingly, means are provided to negate these stresses and to hold the film 36 in a predictable and constant relationship to the application shoe of the processor assembly 34. These means may vary from a substantially flat back-up plate 38 to a fixed, curved back-up surface. A guide rail engaging means 40 is utilized for purposes of holding the film flat leaving the center area of the film open for exposure, as for example by means of lens and shutter assembly 42 onto the emulsion surface of the film. Naturally, the means employed to hold the film relative to the applicator shoe of the processing assembly 34 are dependent upon several factors. These include the type of film base, the thickness of the film base, the width of the film, the temperature of the applied liquid, and the tension of the film at the area of application. It has been found that in order to extend the surface area of processing a convex cylindrical curvature toward the emulsion surface of the film is useful in holding the film flat over these larger areas. The term "flat" in this sense refers to flatness transverse to the longitudinal direction of the film travel. Under the circumstances, in order to use shoe applicators close to the film over larger areas, curved film backing means as well as matching curved applicator shoes may be employed.

The applicator shoe of the processing assembly 34 may be curved in a concave cylindrical shape to duplicate, exceed the radius or be less than the radius of the back-up means. For example, the back-up means 38 is relatively flat and the illustrated shoe of substantially the same configuration. The liquid, heated by exchange with the thermostatically controlled shoe body of processing assembly 34, is adhered firmly between the exterior surface of the shoe and the film emulsion. The adhesive forces are relatively high, the cohesive forces of the aqueous solution are also relatively high, and the liquid is confined to the application area by the bounding meniscus thus created.

In the illustrated and somewhat preferred form of the invention, processing liquid is forced by slight positive pressure applied by a small positive displacement pump assembly 44 through the porous shoe of the processing assembly 34 and onto the film 36. The rate of solution flow may be, but is not necessarily, regulated to the linear velocity of the film 36. Processing uniformity is assured by good hydraulic practices in manifolding within the shoe body of the processor assembly 34, thereby providing uniform flow to all parts of the porous shoe. In addition, means within the shoe body reduce the effect of liquid pulsing which may be derived from the peristaltic action of very simple squeezed flexible tube pumping devices such as the pumping assembly 44 and assure uniform processing liquid distribution. Processing uniformity is further enhanced by agitation due to the shearing action produced by the relative motion between the film 36 and the applicator shoe of the processor assembly 34. Excess liquid is drained off the edges of the applicator shoe into a sump from which it may flow to a lower level such as into a waste tank assembly 46, or it may be removed by a pump.

The porous shoe-type applicator assembly 34 may be utilized with nearly all known photographic chemicals and development systems, including the following: developers which have a chemical action that is arrested by drying following liquid application; arrested developers which are relatively independent of the development time beyond a minimum; mono-baths which contain combination developing and fixing agents, and which go to the completion if given sufficient reaction time; and conventional high energy developers and fixers used in two bath processes. Thus, a developer and fixer supply 48 may be incorporated into the apparatus 30 of the present invention.

In the disclosed apparatus, a two-shoe processor is employed utilizing a mono-bath in the first station. The second station applies a fixer to clear the unexposed silver halide. Thus, the mono-bath process is modified to a two-step process to permit greater development energy with retention of the ability of the mono-bath, within limits, process to a constant result independent of time and/or temperature. Other chemical combinations may be used in the two-shoe processor assembly 34, including a developer-stop, or developer-stabilize system and develop-fix system.

The shoe processing technique may be extended to more than two shoes by modifications to the basic configurations disclosed for multi-bath processing, such as for reversal processing or color processing. The shoe processor technique, with suitable adaptations, may be utilized for step-wise as well as for continuous processing systems.

Viewing of the developed image may be accomplished by several means. Thus, the image may be viewed by reflected external light while the image is developing (with non-backed film), provided the viewing light is filtered to be non-actinic with respect to the film emulsion (e.g. a red filter with blue-only emulsion sensitivity). Following exit from the applicator shoe, the image may be viewed, on the other hand, by a transmitted light means 49 incorporating a built-in illuminator, or it may be projected by a suitable optical system. In this connection, the image may be viewed with white light since the image has been generally either fixed or stabilized at this point.

Drying of the film may be rapidly accomplished after liquid application by impingement of heated air of relatively high velocity, as for example through the employment of blower assembly 52.

It has been shown that the film may remain stationary for prolonged intervals with solution flowing at a normal or reduced rate. Upon a predetermined signal, the film is moved at a certain fixed rate through the processing station, until the processed image exits from the area devoted to solution application. It may then be viewed, projected or cut off as desired.

Reference is now made to a detailed consideration of the several components of the camera processor 30 disclosed herein as well as their relationship to one another, which thus renders the apparatus entirely self-contained and operable.

In the drawing, the casing 32 of the camera processor 30 includes a pair of removable and detachable covers 60 and 62 suitably secured with respect to one another as well as to a base plate 66, as, for example, by a number of properly located nut and bolt assemblies 64. This base plate 66 mounts a centrally located partition 68 and resilient bumpers 70 adjacent its corners. The housing cover 60 has formed therein an opening 71 for purposes of extending the lens and shutter assembly 42 from its front face. A slot 72 is provided in the top face of the cover 60 so that processed film 36 may be removed from the apparatus 30, if desired. The rear face of the cover 60 is further provided with a suitable number of air vents 74 for facilitating the removal of heated air as well as the circulation of air within the housing 32. A window 76 covered by a viewing glass 78 is disposed immediately below the vents 74 so that processed film can be viewed subsequent to its development.

A thumb screw 75 extends through a suitable opening in cover 60 and cooperates with a tapped rod 77 extending from the partition 68 for purposes of securing the cover 60 relative to the other cover 62.

The cover 62 has mounted on the inner face of its front an angle bracket 80 which suitably mounts a fuse assembly 82 and an electrical power input connector 84. The front of cover 62 is provided with a series of air inlet apertures 86 adjacent the bracket 80, whereas the rear of the housing cover 62 lets through a switch plate 88 which is supported by bracket 90. The inner face of this cover supports bracket 90 having a heater switch 92, a light switch 94 and a drive switch 96, all of which are capable of being actuated exteriorly of the cover 62 by having parts thereof extend through openings in the switch plate 88.

The cover 62 is suitably bored to receive a thumb screw 98 which extends through the bore of collar 100, which in turn is anchored to the cover 62. The thumb screw 98 mounts at its free end a beveled gear adjustment 102, the purposes of which will become apparent shortly.

*Film Supply Cassette Assembly*

The film supply cassette assembly 35 containing the film 36 to be exposed and processed by the apparatus 30 of the present invention is located interiorly and at the top of the housing cover 60. The cassette assembly 35 includes a cylindrical case 108 having a co-axially extending film mounting spool 110 which is rotatable on post 112 secured to the partition 68. The case 108 is adapted to be closed by a cover 114 which is retained in such position by a nut 116. Thus, the film supply will be in the form of a light-tight cassette assembly 35 which is not limited as to size and which accommodates the maximum length of film known to be at present commercially available, under normal circumstances. Obviously, a film footage counter in the camera could be incorporated to indicate the amount of unused film in the cassette assembly. A warning switch could also be provided to indicate when the film supply has reached a certain point, as for example 25 feet, from the terminal end distal the free end of the film 36. A switch in the apparatus 30 could indicate when the film supply is exhausted and, accordingly, operate to shut down the camera when operating either in a continuous or step-wise manner.

*Film Guide System*

The free end of film 36 is suitably guided through the exposure, processing and drying stations within the housing 32 and driven out through the slot 72 in cover 60. To this end, a web of film 36 is passed out through a slot 120 in the case 108 over guide rollers 122 and 124. Roller 124 is rotatably mounted by associated legs of a T 126 and projects from the partition 68. The roller 122, on the other hand, is rotatably mounted and projects from the partition 68 through its association in the bracket 130.

The web of film 36 extends through a gate means 40 which includes a pair of guide rails 136 and 138, each of which is spring-biased against the lamp house assembly 49 through an interposed platen 140 and insulating board 142. In this connection, the guide rails 136 and 138 are so connected to a bracket plate 144 which is secured to the partition 68. This gating area provides for precise location of film 36 during exposure.

The web of film 36 is then adapted to pass over back-up plate 38 which also closes the base of the lamp house assembly 49. The lower face 148 of the shoe 38 is substantially planar and extends into arcuate marginal side edges 150 and 152. The film 36 is passed over the shoe 38, at which time it is subjected to a processing operation.

The processed film 36 is then led through the viewing stage where it can be viewed through window 76.

The web of film 36 subsequently passes over roller 154 which is rotatably mounted by the other arm of the T 126. The processed and viewed web of film 36 is then passed between the film driver roller 156 and pinch roller 158 from whence it is driven out through the slot 72 in the housing cover 60. The roller 156 is suitably keyed to a shaft 160 which is driven in a manner to be described shortly. The pinch roller 158, on the other hand, is rotatably mounted on shaft 162 through a suitable bearing means 164. The shaft 162 is mounted by a bracket 166 which is suspended by a stand-off 168 and 170 extending from T 126. A suitable spring means (not shown) may be interposed between the bracket 166 and stand-off 168 and 170 for purposes of creating a bias which will enable the pinch roller 158 to exert a predetermined amount of pressure on the film drive roller 156.

*Camera*

For purposes of describing a specific embodiment of the present invention, the drawings illustrate a camera having a conventional lens and shutter assembly 42 of a type commercially available. Accordingly, the assembly 42 may be a 3″ (75 mm.) $f/1.9$ Oscillo Raptar $1:5x$ in #3 Alphax manufactured by the Wollensak Optical Company, Rochester, New York.

The lens and shutter assembly 42, as supplied by the manufacturer, is mounted on the housing 32 by bracket 174 by means of retainer 176, lens mount 178 and ring 180. It should be understood that the present invention is in no sense limited by the employment of assembly 42 and the light-sensitive film 36. To the contrary, radiation sensitive film may be utilized for use with the other forms of radiation such as X-ray or infra-red. On the other hand, film other than the 70 mm. film disclosed herein of different size characteristics and proportions can be adopted and employed.

*Processing Assembly*

The exposed film 36 is eventually subjected to the processing station with the emulsion surface of the film 36 facing downwardly so that the different processing liquids can be applied thereto. Thus, the processing assembly 34 will include a processor block 184 and heater block 186 immediately below the substantially flat back-up shoe 38.

In accordance with the specific embodiment illustrated, a developer and fixer system is utilized in which a developer mono-bath is supplied by tank 188 and fixer by tank 190. These processing liquids are suitably heated in heater block 186 and applied by processing block 184 and subsequently drained into a waste tank 192.

The tanks 188 and 190 are supported side-by-side by a bracket 194 suspended from a manifold 196. In this connection, the tanks 188 and 190 are connected to the manifold 196 by means of tubes 198 and 200, respectively. Tube 198 is coupled with a cap 202 and insert 204 extending into the developer tank 188. The tube 200, on the other hand, is coupled with the cap 206 and insert 208 extending into the fixer tank 190. Grommet-type connections 210 and 212 are employed, respectively, for the purposes of connecting tubes 198 and 200 to the manifold 196. Suffice it to say at this time that the developer solution flows through passageway 216 while the fixer solution enters passageway 218 of the manifold 196; and both solutions then pass through the pump assembly 44 which will be described in further detail shortly. From the pump assembly 44 the solutions are forced through the heater block 186. In this connection, the developer solution flows through passageway 220 in the heater block while the fixer solution passes through passageway 222. The heater block 186 is supported by the partition 68 by means of the mounting bracket 226 and is suitably bored for purposes of receiving heating means 230 and 232, a thermostat 234 and temperature-sensing means 236, all of which are conventional and commercially available; thus, they have not been illustrated and disclosed in detail herein, but merely illustrated in block form. In the heater block 186, the developer and fixer solutions are suitably heated by heater means 230 and 232 to the desired temperature, which can be readily determined by temperature-sensing means 236 and controlled through the employment of a thermostat 234. As will be appreciated by those skilled in the art, elevated temperatures permit significant decreases in processing time.

The developer and fixer solutions are then passed through passageways 240 and 242, respectively, in the processor block 184. The manifolding of the processor block 184 also includes a series of ports 244 communicating with passageway 240 and series of ports 246 communicating with passageway 242. Thus, the developer solution is permitted access to compartment 248 which contains a restricting and anti-sloshing wick 250 which may be formed from chemically inert Dacron material. A porous shoe 252 covers compartment 248 and functions to expose the emulsion side of the film 36 to the developer solution.

The fixer solution, likewise, passes into a chamber 254 containing a dampening wick 256 similar to wicking 250 and is covered by a porous shoe 258. This fixer shoe 258 serves to apply the fixer solution to the exposed emulsion side of the film 36.

In the disclosed embodiment, a 6 to 10 thousandths of an inch clearance is contemplated between the film 36 and upper face of the processing shoes 252 and 258. In this connection, the applicator shoes 252 and 258 cooperate to produce a processing station at which a relatively thin layer of developer as well as fixer are present thereon having capillarity creating meniscal boundaries of processing fluid with film 36.

Obviously, the processor block 184 will be transfer-heated from the thermostatically controlled heat exchanger block 186. Solution temperatures in the applicator block in a number of contemplated processing operations will be in the order of 130° F.; a minimum quantity of solution will obviously be maintained at the elevated temperature. Dependent upon the specific chemicals chosen, squeegee removal of excess liquid may be provided between applicators and prior to drying, for example, by resilient squeegee 259.

The processing solutions are therefore applied in the form of a meniscus, extended over the desired area by the applicator shoes 252 and 258. The solutions are adhered by relatively high forces between the film emulsion surface of the film 36 and the applicator shoes 252 and 258. These solution processor shoes 252 and 258 are each supplied by the pump assembly 44 to be described shortly. The solution quantity need not be varied with film travel rate as long as a minimum pumping rate is provided for the maximum expected film travel rate. On standby, the excess solution would drain off in the same manner as with moving film. The pump assembly 44, as will be evident shortly, is designed as the well-known squeezed rubber tubing pumping devices, and, under normal circumstances, will supply solution at a rate of about ⅔ of a drop per second. Agitation of the processing solutions is provided by the shearing action of the film through the liquid to the applicator members 252 and 258.

When considering increasing the length of applicator assembly 34 for purposes of increasing film, travel rate, and consequently, speedup the development process, it may be found that the distribution of the processing liquid between the shoe and the surface of film will be such that a starving-off of liquid will be present in the center of the film. If this be the case, a thin stainless steel plate (not shown) having a series of holes may be placed between the porous processing shoes 252 and 258 and the associated manifold chambers 248 and 254. These holes are advantageously placed to effect the transverse distribution of the liquids, and the location of more holes in the center of the plate, in accordance with an empirical determination, should alleviate the problem.

The excess processing solutions are adapted to flow into a drain trough 260 in the processor block 184. A drain hole 262 in the processor block 184 transfers the excess solution to a drain tube 264 provided in the heater block 186 and projecting down into waste tank 192. As will be observed, this waste tank 192 is suitably mounted by a bracket 266 which is anchored to the partition 68.

A pair of captive screws 268 and 270 are threadedly received by tapped bores extending through heater block 186 into the processor block 184. Accordingly, these blocks are adapted to be aligned, while at the same time the processor block is permitted to be removed for proper cleansing or the like.

As will be evident to those skilled in the art, both of the supply tanks 188 and 190, as well as waste tank 192, are not only removable but replaceable, for purposes of satisfying particular conditions and requirements.

*Pump Assembly*

As mentioned in the foregoing, the pump assembly 44 is of the very small constant displacement variety capable of supplying processing solution at a rate of about ⅔ of a drop per second. Thus, the developer solution from the intake manifold 196 passes through tubing 274 and is forced by the pump assembly through tubing 276 into passageway 220 of the heater block 186. The fixer solution, on the other hand, passes through tubing 278 from the intake manifold 196 through the pump assembly 44 and then out through tubing 280 into passageway 222 of the heater block 186. Four similarly constructed nipples 282 serve to receive the tubings passing to and from the pump assembly 44. These nipples also cooperate with an adjustable clamping arrangement 284 consisting of a number of displaceable blocks for purposes of mounting a section of developer solution tubing 286 and a section of fixer solution tubing 288.

In brief, the pump assembly 44 includes a housing 290 mounting a rotatably driven shaft 292 through interposed bearings 294 and 296. This shaft 292 drives a spindle 298 which mounts a pair of spacers 300, each of which rotatably supports a roller 302 through interposed bearings 304 and 306. Accordingly, as shaft 292 rotates, the rollers 300 will press against internal tubings 286 and 288 to positively displace the processing solutions contained therein.

*Lamp House Assembly*

Referring now to the lamp house assembly 49, it will be observed that a lamp housing 310 conveniently encases a suitable number of lamps 312 mounted by suitable angle brackets 314 and 316. The lamp housing 310 is supported by the partition 68 and includes a light-transmitting wall 318. This wall includes a vertically extending opening 320 which cooperates with vertically disposed opening 322 formed in the lamp housing 310 as well as partition 68 for purposes of providing communication with the blower assembly 52 in a manner to be explored in detail shortly. It should be clear that the exposed and processed film 36 is adapted to be viewed through window 78 in the housing cover 60 by the light transmitted from lapm 312 through wall 318.

*Blower Assembly*

The blower assembly 52 is mounted on the partition 68 and includes blower motor 326 which drives blades 328 disposed in the shield 330. Under the circumstances, air will be drawn through the intake ports 86 in the housing cover 62 by the rotating blades 328, forced through opening 322, passed out through opening 320, then effectively blown over the exposed and processed film 36, for purposes of drying its emulsion side, and ultimately discharged out through the air vents 74.

Film and Pump Drive

The drive for the roller 156 and pump assembly 44 includes a motor 336 which is mounted by bracket 338 to partition 68. A spur gear 340 is driven by the motor 336 which, in turn, meshes with an enlarged spur gear 342 mounted on shaft 344 rotatably supported by gear mount 346 which is connected to the partition 68. This shaft 344 additionally mounts a spur gear 348 which is meshed with spur gear 350 connected to the shaft 292 of the pump assembly 44.

A variable speed unit 354 which is commercially available, is adapted to take off or receive the output of the motor 336 and change speed to another value which is adjustable through the manipulation of the thumb screw bevel gear adjustment 98. To this end, the output of this unit 354, which is supported on the partition 68 by means of bracket 356, is transmitted to the worm gear 358 which meshes with the gear 360. This gear 360, in turn, in turn, is fixedly connected to the shaft 160 of the film drive roller 156.

From the foregoing, it should be evident that the motor 336 actuates the flow of the processing liquids as well as the film travel rate. Obviously, the quantity of processing liquid or solution supply could be varied with the film travel rate. However, this is not necessary as long as a minimum pumping rate is provided for the maximum expected film travel rate. To enhance simplicity of design as well as reliability, the embodiment of the invention disclosed contemplates the employment of a constant pumping rate with the effective rate adjustment being provided with respect to the travel of the film 36. If desired for different purposes, the film drive rate and pump need not be synchronized but an independent pump drive could be utilized with different rates.

Operation

In preparing the camera processor apparatus 30 for operation, a loaded film cassette 35 is properly mounted, with the housing cover 60 removed; and a web of film 36 is threaded through the gate means 40, around the flat back-up shoe 38, through the viewing means 49, between the film drive roller 156 and pinch roller 158, and located such that it will project out through slot 72 of the housing cover 60. A fresh supply of developer solution and fixer solution are coupled to the processor assembly in tanks 188 and 190, respectively. An empty waste tank 192 is also inserted to receive any excess developer and fixer solutions drained from the processor block 184. After the housing cover 60 is assembled and secured by means of the thumb screw mounting 75, the camera processor is connected to a suitable supply of electrical energy through the input connectors 84.

The heater switch 92 is closed for purposes of energizing the heating means 230 and 232 of the heater block 186 and, consequently elevate the temperature of the processing liquids to be ultimately applied to the emulsion side of the film 36. The light switch 94 is closed to illuminate the lamps 312 of the viewing assembly 49 so that the exposed and processed film 36 can be viewed through the window 76. The film drive switch 96 is also closed for the purpose of driving the film 36 through co-operation between the film drive roller 156 and pinch roller 158. The rate of film advance is adjusted by means of the thumb screw adjustment 98 which regulates the r.p.m. output of the Metron-type unit 354. It should be understood that the actuation of the blower assembly 52 could be accomplished by closing any of the aforementioned switches; and, for purposes of the present disclosure, the blower assembly will be set into operation upon closing the light switch 94. As will be appreciated, the closing of switch 94 will operate the drive motor 336 and pump assembly 44 and, consequently, permit the flow of the processing liquids to their respective applicator shoes 252 and 258, the excess of which will be drained off into the waste tank 192.

Assuming that light-sensitive film 36 is employed, but it should be understood that other radiation sensitive materials are equally applicable to the present invention, lens and shutter assembly 42 is suitably set and focused for purposes of exposing the film 36 as desired. The shutter mechanism of this assembly 42 is then tripped to expose the film 36 which is being continuously driven at this time. The exposed section of the film 36 is then passed through the processor assembly 34 where a layer of developer solution, and subsequently fixer solution, is applied to the emulsion side of the film 36 as a result of the created capillary and meniscal boundaries. The processed sector of the film 36 is then passed through the viewer means 49 to determine the characteristics and quality of the processed and exposed film sector. The blower assembly 52 creates suitable air currents and circulation within the housing 32 such that this film sector is suitably dried as it leaves the processor station. The exposed, processed and viewed film sector is then driven out through the slot 72 of the housing cover 60.

It should be understood that a washing, as well as cutting, station can then be incorporated either within the camera processor 30 or at some other location.

As will be apparent, other sectors of the film 36 can be exposed either by a manual operation of the camera or by employment of a timing means of the like. Thus, a continuous film exposure processing unit is provided with a minimum amount of time lag between stations within the unit 32 which obviously possesses optimum simplicity and efficiency. Although a specific embodiment has been shown and described, it should be understood that the invention is in no sense limited thereby and many modifications are necessarily within the purview of those skilled in the art. Therefore, the present invention is to be determined by the scope of the appended claims.

I claim:

1. Apparatus for developing a recorded image on a film strip having a radiation sensitive surface and a support means, said apparatus having a housing; support means within said housing for a source of supply of film; film processing means including a stationary porous applicator adapted to apply a relatively thin layer of processing fluid having capillarity and meniscal boundaries to an exposed predetermined portion of the film, said processing means including a fixed substantially flat support spaced from said porous applicator and proximately located relative thereto for forming a narrow passage therewith for reception of said film strip and for engaging the support means of the film adjacent the exposed predetermined portion such that the sensitive surface of the film is disposed a relatively short distance in the order of a capillary space from the porous applicator such that the film is free from contact with the porous applicator and the thin layer of processing fluid is disposed between the porous applicator and the film; guide means for guiding said film through said processing means; and means for providing a controlled time relationship between the film transport through the processing means and application of the processing fluid such that an excess of the processing fluid is presented by the applicator at all times.

2. The invention in accordance with claim 1 wherein exposure means are mounted on said housing for exposing a predetermined portion of the radiation sensitive surface of the film to record an image of an object thereon.

3. The invention in accordance with claim 2 wherein a blower means is disposed within said housing for drying the exposed and processed predetermined portion of said film after it passes through said processing means.

4. The invention in accordance with claim 1 wherein a supply of processing liquid is disposed within said housing, a relatively small positive displacement pump mounted in said housing, a conduit means connecting said source of processing liquid to the applicator of said processing means through said pump such that said processing liquid flows through said applicator in predetermined quantities at a constant rate.

5. The invention in accordance with claim 4 wherein film drive means are mounted within said casing for driving said film through said processing means, and said film drive means and said pump being synchronized to provide a predetermined rate of travel of said film and flow of said processing liquid.

6. The invention in accordance with claim 4 wherein means are interposed in said conduit means adjacent said applicator for regulating the flow pattern of processing liquid through said applicator.

7. The invention in accordance with claim 1 wherein said processing means further includes a drain for excess processing liquid subsequent to its flow through said applicator, and means within said housing for receiving the drained processing liquid.

8. The invention in accordance with claim 2 wherein viewing means are located beyond said processing means within said housing for permitting visual inspection of the exposed and processed predetermined portion of the film.

9. The invention in accordance with claim 1 wherein heating means are disposed adjacent said applicator for heating said processing liquid prior to its flow through said applicator.

10. A processing means for continuously processing a strip having a support means and a coated surface thereon to be processed, the processing means including a stationary porous applicator adapted to apply a relatively thin layer of processing fluid having capillarity and meniscal boundaries to the coated surface, said processing means including a fixed substantially flat support spaced from said porous applicator and proximately located relative thereto for engaging the support means of the strip adjacent the coated surface to be processed such that the coated surface is disposed a relatively short distance in the order of a capillary space from the porous applicator such that the strip is free from contact with the porous applicator and the thin layer of processing fluid is disposed between the porous applicator and the strip; guide means for guiding said strip through said processing means; and means for providing a controlled time relationship between the strip transport through the processing means and application of the processing fluid such that an excess of the processing fluid is presented by the applicator at all times.

11. The invention in accordance with claim 10 wherein said processing means includes a supply of processing liquid and a relatively small positive displacement pump, and conduit means connecting said source of processing liquid to the applicator through said pump such that said processing liquid flows through said applicator in predetermined quantities at a constant rate.

12. The invention in accordance with claim 11 wherein a strip drive means drives said strip through said processing means, and said strip drive means and said pump being synchronized to provide a predetermined rate of travel of said strip and flow of said processing liquid.

13. The invention in accordance with claim 11 wherein means are interposed in said conduit means adjacent said applicator for regulating the flow pattern of processing liquid through said applicator.

14. The invention in accordance with claim 10 wherein said processing means further includes a drain for excess processing liquid subsequent to its flow through said applicator and means for receiving the drained processing liquid.

15. The invention in accordance with claim 10 wherein heating means are disposed adjacent said applicator for heating said processing liquid prior to its flow through said applicator.

References Cited in the file of this patent

UNITED STATES PATENTS

| | | |
|---|---|---|
| 2,431,041 | Hassler | Nov. 18, 1947 |
| 2,548,573 | Wampole | Apr. 10, 1951 |
| 2,587,350 | Maiwald | Feb. 26, 1952 |
| 2,856,829 | Orlando | Oct. 21, 1958 |
| 2,922,352 | Tuttle | Jan. 26, 1960 |
| 2,930,302 | Tuttle | Mar. 29, 1960 |

FOREIGN PATENTS

| | | |
|---|---|---|
| 470,197 | Great Britain | Aug. 11, 1937 |